(12) United States Patent
Yang

(10) Patent No.: US 11,087,277 B1
(45) Date of Patent: Aug. 10, 2021

(54) METHOD FOR MANAGING INVENTORY AND APPARATUS THEREOF

(71) Applicant: Coupang Corp., Seoul (KR)

(72) Inventor: Byung Suk Yang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/996,755

(22) Filed: Aug. 18, 2020

(30) Foreign Application Priority Data

Feb. 12, 2020 (KR) ........................ 10-2020-0016943

(51) Int. Cl.
G06Q 10/08 (2012.01)
G06F 16/23 (2019.01)

(52) U.S. Cl.
CPC .......... G06Q 10/087 (2013.01); G06F 16/23 (2019.01)

(58) Field of Classification Search
None
See application file for complete search history.

(56) References Cited

U.S. PATENT DOCUMENTS

| | | | | |
|---|---|---|---|---|
| 2007/0174146 A1* | 7/2007 | Tamarkin | ............. | G06Q 10/087 705/28 |
| 2015/0073857 A1* | 3/2015 | Akita | ................... | G06Q 10/087 705/7.26 |
| 2015/0294333 A1* | 10/2015 | Avegliano | ............. | A47F 5/0043 705/7.31 |

FOREIGN PATENT DOCUMENTS

| | | |
|---|---|---|
| JP | 2002-157315 | 5/2002 |
| JP | 2005-001832 | 1/2005 |
| JP | 2010-143726 | 7/2010 |
| JP | 2014-152018 | 8/2014 |
| JP | 2019-075016 | 5/2019 |
| KR | 10-2015-0143244 | 12/2015 |
| KR | 10-2016-0044320 | 4/2016 |
| KR | 10-1778758 | 5/2017 |
| KR | 10-1963999 | 7/2019 |

OTHER PUBLICATIONS

International Search Report received in PCT/KR2020/011777, dated Dec. 4, 2020.

* cited by examiner

*Primary Examiner* — Paul Danneman
(74) *Attorney, Agent, or Firm* — Knobbe, Martens, Olson & Bear, LLP

(57) ABSTRACT

Provided is a method of managing inventory, the method including receiving location information indicating at least one space location among a plurality of space units and space information corresponding to the location information, calculating a state change amount related to the at least one space location based on at least one of the location information, the space information, and information on a previous space state for each of the plurality of space units, or updating the information on the previous space state for each of the plurality of space units with information on a current space state based on the state change amount. An inventory management apparatus performing the method is provided. A non-transitory computer readable recording medium for performing the method is provided.

17 Claims, 11 Drawing Sheets

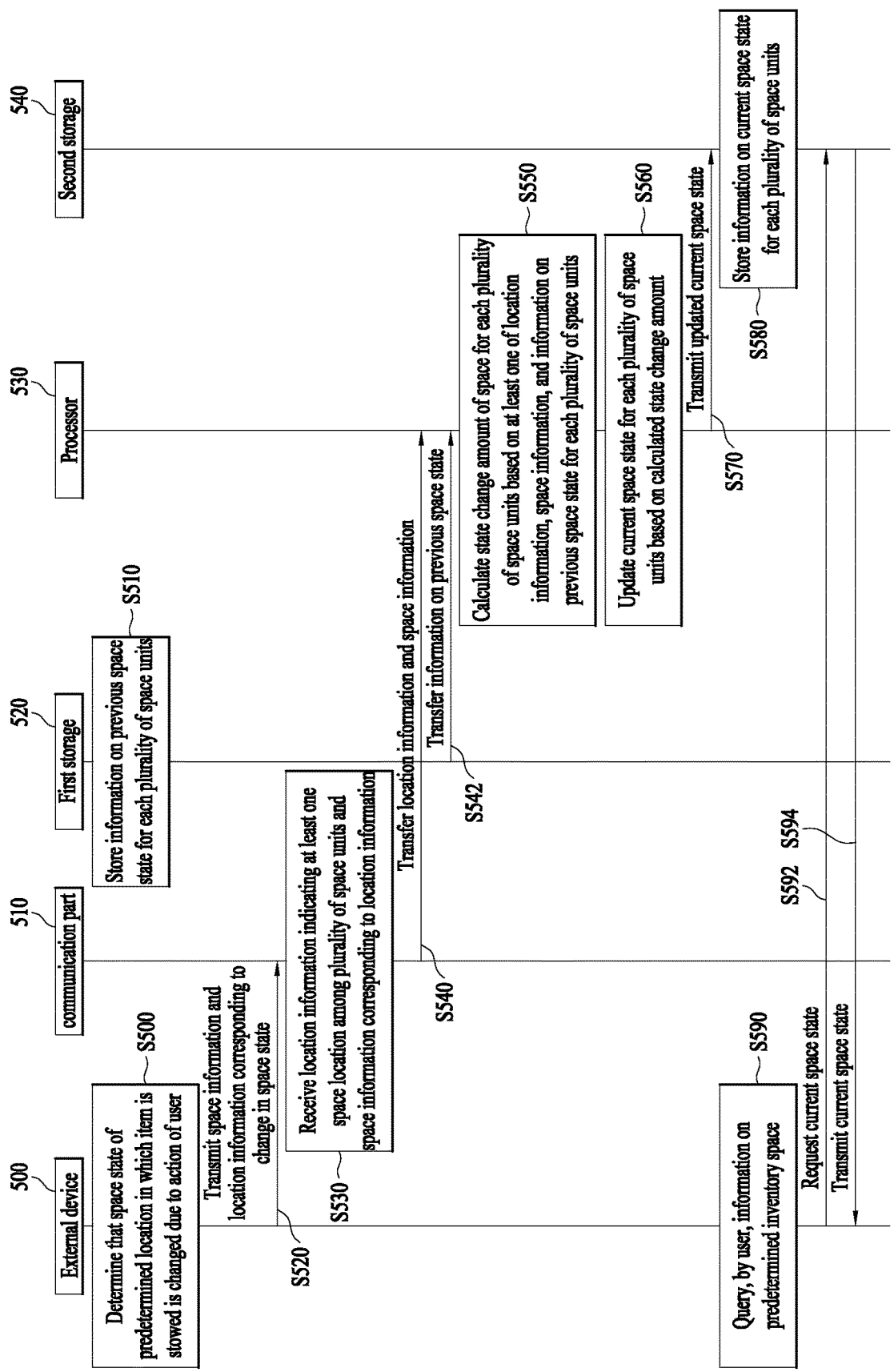

METHOD FOR MANAGING INVENTORY AND APPARATUS THEREOF

BACKGROUND

Technical Field

This disclosure relates to a method and apparatus for managing information on or regarding a space in which inventory is stowed.

Description of the Related Art

With the practical implementation of e-commerce, many users have been purchasing goods on the Internet. In a process of loading and moving items to a warehouse for the sale and shipment of the items, inventory management is related to the speed and accuracy of selling items to users.

When it comes to managing items stowed in a warehouse, it is important to check an item loading space to efficiently load items. Considering that the space for loading items is limited and a physical diversity of each item such as a type, quantity, or volume of the item is significantly high, efficient inventory management is necessary for users who conduct the movement, storage, and recording of stowed items. In a process of selling and shipping numerous items, a quantity of inventory for each warehouse may be managed separately for each loading space.

Loading spaces of each warehouse may be managed based on a variety of vertically-integrated tree structures. Also, information on stock of an item for each of the spaces may be managed based on a quantity of inventory allocated for each of the structures.

In related arts, information about the stock of the item and information on the loading space may be separately recorded in a relational database (RDB) as individual tables. Also, an operation may be performed by reading data recorded in various tables of the RDB at the time of information acquisition in order to acquire a space usage status which is a result obtained by calculating and combining inventory information and loading space information. Thus, in order to acquire usage statuses of the loading spaces of various types, locations, or sizes, accesses to numerous RDBs are required. However, in such cases, an increase in load of the RDB or degradation of responsiveness may occur. Accordingly, it is difficult to check the usage statuses of the loading spaces in real time.

SUMMARY

Technical Goals

An aspect provides a method and apparatus for quickly providing information on or regarding an individual loading space and a usage status of an upper loading space including the individual loading space.

The present disclosure should not be limited to the aforementioned aspects and advantages, and other unmentioned aspects and advantages will be clearly understood by those skilled in the art from the following description and more clearly understood in implementations of the present disclosure. Furthermore, the aspects and advantages of the present disclosure can be realized by means disclosed in the accompanying claims or combination thereof.

Technical Solutions

According to an aspect, there is provided an apparatus for managing inventory, the apparatus including a communication part or component configured to receive location information indicating at least one space location among a plurality of space units and space information corresponding to the location information, and an operation part or component configured to calculate a state change amount related to the at least one space location based on at least one of the location information, the space information, or information on or regarding a previous space state for each of the plurality of space units and update the information on the previous space state for each of the plurality of space units with information on or regarding a current space state based on the state change amount.

The space information may include at least one of a number of inventories stowed, a number of inventory types, a total inventory volume, or a total loadable volume regarding a space corresponding to the location information.

The operation part may be configured to update the information on the previous space state with the information on the current space state by calculating the state change amount and updating at least one of a number of inventories, a number of inventory types, a total inventory volume, or a total loadable volume for each of the plurality of space units.

The communication part may be configured to receive the location information indicating a space location for each at least two units among the plurality of space units which are hierarchical space units.

The operation part may be further configured to transmit the updated information on the current space state for each of the plurality of space units to a second storage.

The communication part may be configured to receive the location information and the space information when a state of a space is changed.

The operation part may be configured to perform based on the state change amount accumulated for a predetermined period of time.

The operation part may be configured to update the information on the previous space state with the information on the current space state by accumulating, for the predetermined period of time, the state change amount calculated in response to information on an item or information on a loading space being changed collectively.

According to another aspect, there is provided a method of managing inventory, the method including receiving location information indicating at least one space location among a plurality of space units and space information corresponding to the location information, calculating a state change amount related to the at least one space location based on at least one of the location information, the space information, and information on a previous space state for each of the plurality of space units, or updating the information on the previous space state for each of the plurality of space units with information on a current space state based on the state change amount.

The space information may include at least one of a number of inventories, a number of inventory types, a total inventory volume, or a total loadable volume regarding a space corresponding to the location information.

The updating may include updating the information on the previous space state with the information on the current space state by calculating the state change amount and updating at least one of a number of inventories, a number of inventory types, a total inventory volume, or a total loadable volume for each of the plurality of space units.

The receiving may include receiving the location information indicating a space location for each at least two units among the plurality of space units which are hierarchical space units.

The method may further include transmitting the updated information on the current space state for each of the plurality of space units to a second storage.

The receiving may include receiving the location information and the space information when a state of a space is changed.

The updating of the information on the previous space state may include updating the information on the previous space state with the information on the current space state based on the state change amount accumulated for a predetermined period of time.

The updating of the information on the previous space state may further include updating the information on the previous space state with the information on the current space state by accumulating, for the predetermined period of time, the state change amount calculated in response to information on an item or information on a loading space being changed collectively.

According to another aspect, there is also provided a non-transitory computer readable recording medium including a computer program for performing the above-described method.

Effects

According to an aspect, it is possible to According to example embodiments, it is possible to provide an inventory management method and apparatus to quickly and accurately perform inventory management for each loading space.

According to example embodiments, it is possible to provide an inventory management method and apparatus to quickly and accurately provide a user with information on inventory managed for each loading space.

Effects are not limited to the aforementioned effects, and other effects not mentioned will be clearly understood by those skilled in the art from the description of the claims.

BRIEF DESCRIPTION OF THE DRAWINGS

FIG. 5 is a flowchart illustrating an example implemented using an inventory management method according to an example embodiment of the present disclosure.

DETAILED DESCRIPTION

Figure 1:
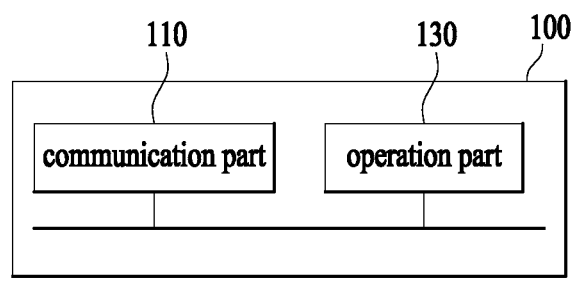
FIG. 1 is a block diagram illustrating an inventory management apparatus according to an example embodiment of the present disclosure.

Hereinafter, embodiments of the present disclosure will be described in detail with reference to the accompanying drawings. The features described herein may be embodied in different forms, and are not to be construed as being limited to the examples described herein.

With respect to constituent elements used in the following description, suffixes "module" and "unit" are given or mingled with each other only in consideration of ease in the preparation of the specification, and do not have or serve as different meanings.

In order to illustrate this application, a part that is not related to the description may be omitted, and the same or similar components are denoted by the same reference numerals throughout the specification. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, in implementing the present disclosure, for convenience of explanation, components may be described by being subdivided; however, these components may be implemented in a device or a module, or a single component may be implemented by being divided into a plurality of devices or modules.

FIG. 1 is a block diagram illustrating an inventory management apparatus 100 according to an example embodiment.

The inventory management apparatus 100 may include a communication part or component 110 that receives location information indicating at least one space location among a plurality of space units and space information corresponding to the location information, and an operation part or component 130 that calculates a state change amount related to the at least one space location based on at least one of the location information, the space information, or information on or regarding a previous space state for each of the plurality of space units and updates the information on the previous space state for each of the plurality of space units with information on or regarding a current space state based on the state change amount.

The communication part 110 may receive location information indicating a space location for each of the plurality of space units and space information corresponding to the location information. The space location for each of the plurality of space units may be a location determined based on a predetermined vertically-integrated space unit. For example, a space unit for each type may be in a relationship including another space unit.

The communication part 110 may receive the location information and the space information in a case in which a state of the space is changed. As an example, the inventory management apparatus 100 may not receive the location information and the space information in a case in which a change in space state is absent. The change may occur due to, for example, a user's action (e.g., stock transfer, a change of an inventory quantity, a change of information on a specific loading space, etc.) that causes a direct change of the space state or a user's action (e.g., a change of an item size, a change of a common state value of a loading space) that causes an indirect change of the space state.

The location information and the space information received by the communication part 110 may include information on a location of a space of which a state is changed and the state of the space. For example, even though the inventory management is performed on all spaces for each a plurality of units, the communication part 110 may receive information associated with the space of which the state is changed and transmit the information to the operation part 130.

The space information received by the communication part 110 may be associated with a smallest space unit (for example, a unit of a bin) among the plurality of space units. Also, the location information may be information represented by the corresponding space unit.

In an example, the communication part 110 may be implemented as hardware that is a separate module distinguished from an operation part. In another example, the communication part 110 may be implemented as a separate program or a separate structure distinguished from the operation part 130 on program. In another example, the communication part 110 may be implemented as a program (e.g., a Kafka system) that transmits data to the operation part 130 based on a predetermined scheme.

The operation part 130 may calculate a state change amount of a space for each space unit corresponding to the location information based on the location information and the space information acquired through the communication part 110. Since the communication part 110 receives the location information and the space information when the state of the space is changed, the state change amount for each space unit may exist. The operation part 130 may further acquire information on a previous space state which is obtained before a state of a space is changed, thereby calculating a state change amount of the space for each space unit. The state change amount may indicate a difference value between a previous state and a current state instead of information indicating an absolute quantity of inventory or a space for each space unit. When a space state is changed, the inventory management apparatus 100 may update a current space state using a difference value thereof, thereby reducing a load in a calculation process and increasing a calculation speed.

The operation part 130 may update a current space state for each a plurality of space units by newly updating information on the current space state based on a calculation result of the state change amount. For example, the operation part 130 may update a current space state for the entire space including a space of which a space state is changed, using a state change amount calculated based on space information and location information associated with the space having the changed space state The operation part 130 may control various components included in the inventory management apparatus 100 to perform various embodiments which are to be performed by the components of the inventory management apparatus 100. The operation part 130 may include at least one of a RAM, a ROM, a CPU, a graphics processing unit (GPU), or a bus, which may be connected to one another. In order to acquire predetermined information, the communication part 110 may use wired communication technologies and may also use wireless communication technologies such as global system for mobile communication (GSM), code division multi access (CDMA), long term evolution (LTE), 5G, wireless LAN (WLAN), wireless-fidelity (Wi-Fi), Bluetooth™, radio frequency identification (RFID), infrared data association (IrDA) communication, ZigBee, near field communication (NFC), and the like, for example.

The inventory management apparatus 100 may use various types of applications to perform a calculation and update process based on received information. For example, the inventory management apparatus 100 may use the Kafka system as a system for receiving predetermined information or use a spark streaming application to update a space state based on received information.

The inventory management apparatus 100 may further include a first storage including at least one of a RAM, a ROM, a CPU, a GPU, or a bus. The first storage may use various storage schemes to store predetermined data based on a distributed data processing method (e.g., Hadoop distributed file system (HDFS), etc.) for processing a large quantity of data such as big data.

Figure 2:
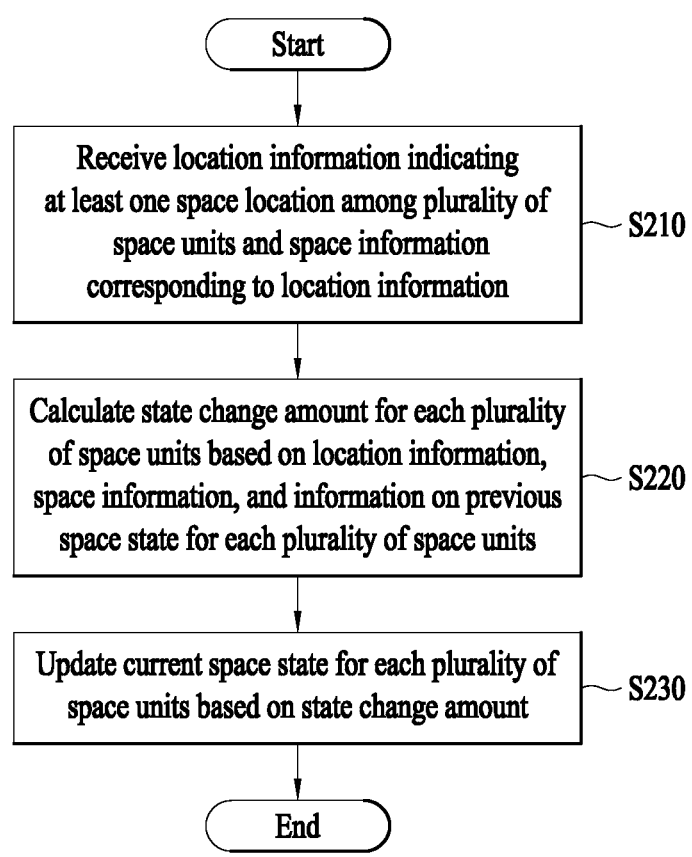
FIG. 2 is a flowchart illustrating an inventory management method according to an example embodiment of the present disclosure.

FIG. 2 is a flowchart illustrating an inventory management method according to an example embodiment.

In operation S210, the inventory management apparatus 100 may receive location information indicating at least one space location among a plurality of space units and space information corresponding to the location information. The communication part 110 may receive the location information and the space information. The location information and the space information may be received from a source external to the inventory management apparatus 100 or received from another component included in the inventory management apparatus 100. When a space state is changed in a predetermined loading space, the communication part 110 may receive location information indicating a corresponding location and space information on or regarding the changed space state In operation S220, the inventory management apparatus 100 may calculate a state change amount for each of the plurality of space units based on the location information, the space information, and information on or regarding a previous space state for each of the plurality of space units. The operation part 130 may calculate a state change amount of a plurality of spaces using the location information and space information acquired through the communication part 110 and the information on the previous space state acquired additionally. The inventory management apparatus 100 may calculate a state change amount of a space having a change in state by acquiring and using the information on the previous space state which indicates a space state obtained before the location information and the space information are received in response to the state of the space being changed. The information on the previous space state may correspond to a cumulative state change amount calculated before a current point in time at which the space state is changed.

Since the state change amount is calculated for a space having a change in space state, information on the state change amount may be generated for the space having the change in space state. For a state change amount of a space having no state change, a result value of zero may be output.

In operation S230, the inventory management apparatus 100 may update a current space state for each of the plurality of space units based on the state change amount. The updating may be performed by updating the information on the previous space state based on the state change amount corresponding to the calculation result of operation S220. Even though the state change amount for the space having the change in state is calculated by the operation part 130, a space state in an upper space unit related to the space having the change in state may also be updated due to correlations between hierarchical spaces.

Data on the calculated state change amount may include at least one data. The current space state may be updated based on the at least one data. According to the present disclosure, since the state change amount (e.g., a difference value obtained due to the state change) is used, when updating the information on the current space state, a load of an operation may be significantly reduced even if data recorded on various tables of an RDB in association with usage statuses of numerous types, locations, or sizes of loading spaces are fetched at the time of the update. Through this, the information on the current space state may be quickly provided to the user.

The information on the previous space state updated based on the state change amount may be stored to be fetched in response to a user's request.

Figure 3:
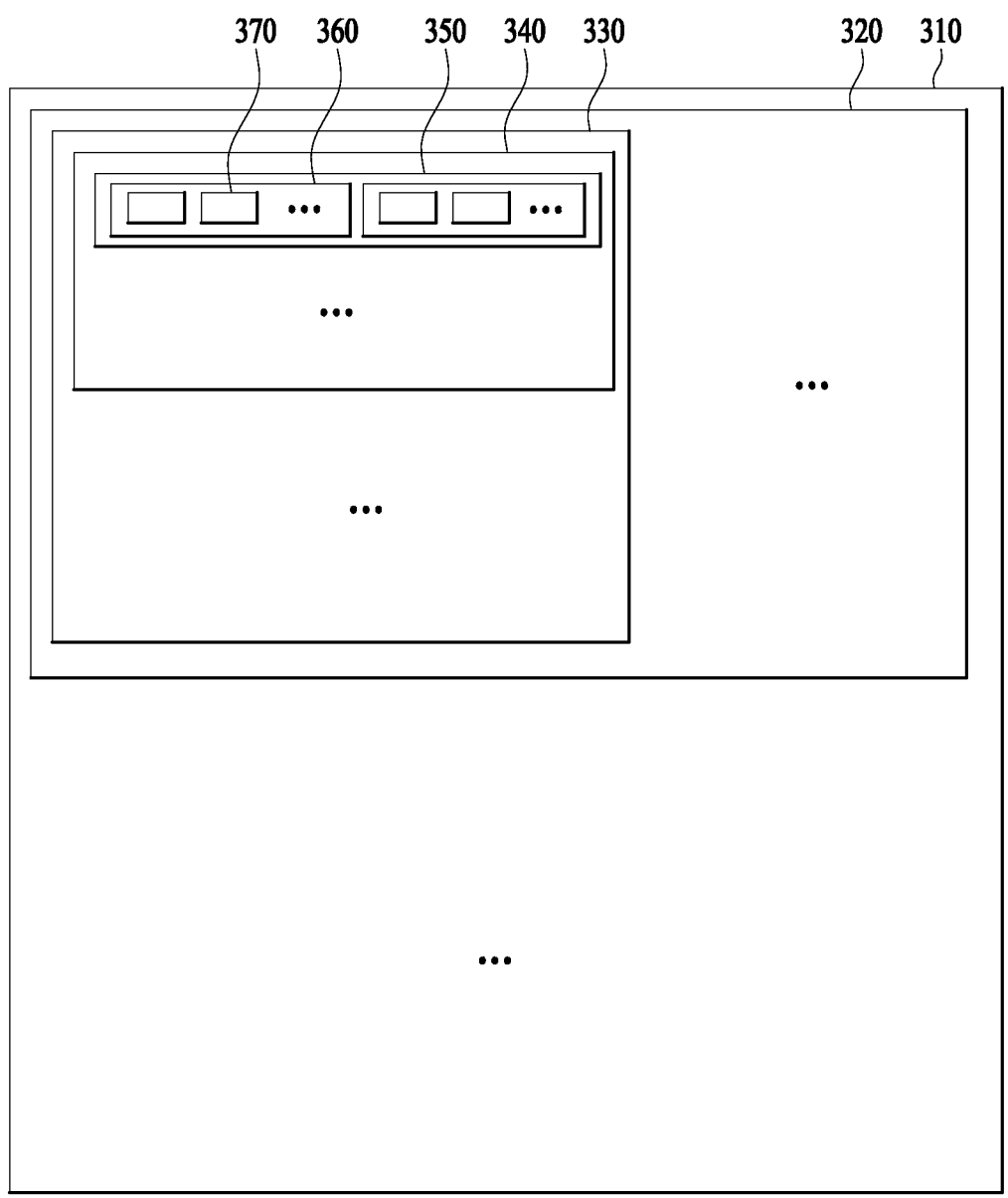
FIG. 3 is a diagram illustrating a hierarchical relationship of loadable spaces according to an example embodiment of the present disclosure.

FIG. 3 is a diagram illustrating a hierarchical relationship of loadable spaces according to an example embodiment.

Location information used in an inventory management apparatus 100 may be constructed to indicate spaces of a vertical hierarchical structure. For example, inventory locations for a plurality of space units may be organized into a center, a floor, a zone, an aisle, a bay, a shelf, and a bin. Referring to FIG. 3, each center 310 may include at least one floor 320, each floor 320 may include at least one zone 330, each zone 330 may include at least one aisle 340, each aisle 340 may include at least one bay 350, each bay 350 may include at least one shelf 360, and each shelf 360 may include at least one bin 370. However, it should not be understood that a type of space unit indicated by location information in various embodiments of the present disclosure is limited to the aforementioned units. Instead, it should be understood that the location information is various types of information indicating locations of spaces divided into various space units having mutual inclusion relations. Therefore, characteristics of location information and space information are not to be construed as being limited to such inclusion relations or terminologies of the space units described above. For example, in terms of the plurality of space units, the shelf 360 and the bin 370 may be used as the same space unit. Thus, a minimum space unit of the plurality of space units may be referred to as the shelf 360 or the bin 370. For brevity, the following description will be made based on a case in which the plurality of space units includes the center 310, the floor 320, the zone 330, the aisle 340, the bay 350, the shelf 360, and the bin 370. The location information received by the communication part 110 may be information indicating a location of a space in which inventory is stowed for each of the plurality of space units. The space information may be information indicating a state of a space corresponding to the location information. The space information may include at least one of various information (e.g., a number of inventories for each space unit, a number of inventory types for each space unit, a total inventory volume for each space unit, a total loadable volume for each space unit, etc.) associated with a space of a location for each space unit. A scheme for constructing the space information may be implemented in various ways within a range that can be easily configured by those skilled in the art.

FIGS. 4A through 4F are diagrams illustrating a process for determining space information for each loading space by calculating a change amount of the corresponding loading space for inventory management according to an example embodiment. In FIGS. 4A through 4F, location information denoted by Z, S, and b are understood as initials indicating a zone, a shelf, and a bin. However, such relationship of the location information is an example for explaining that the location information indicates a hierarchical space and thus, is not to be as being limited thereto.

Figure 4A:
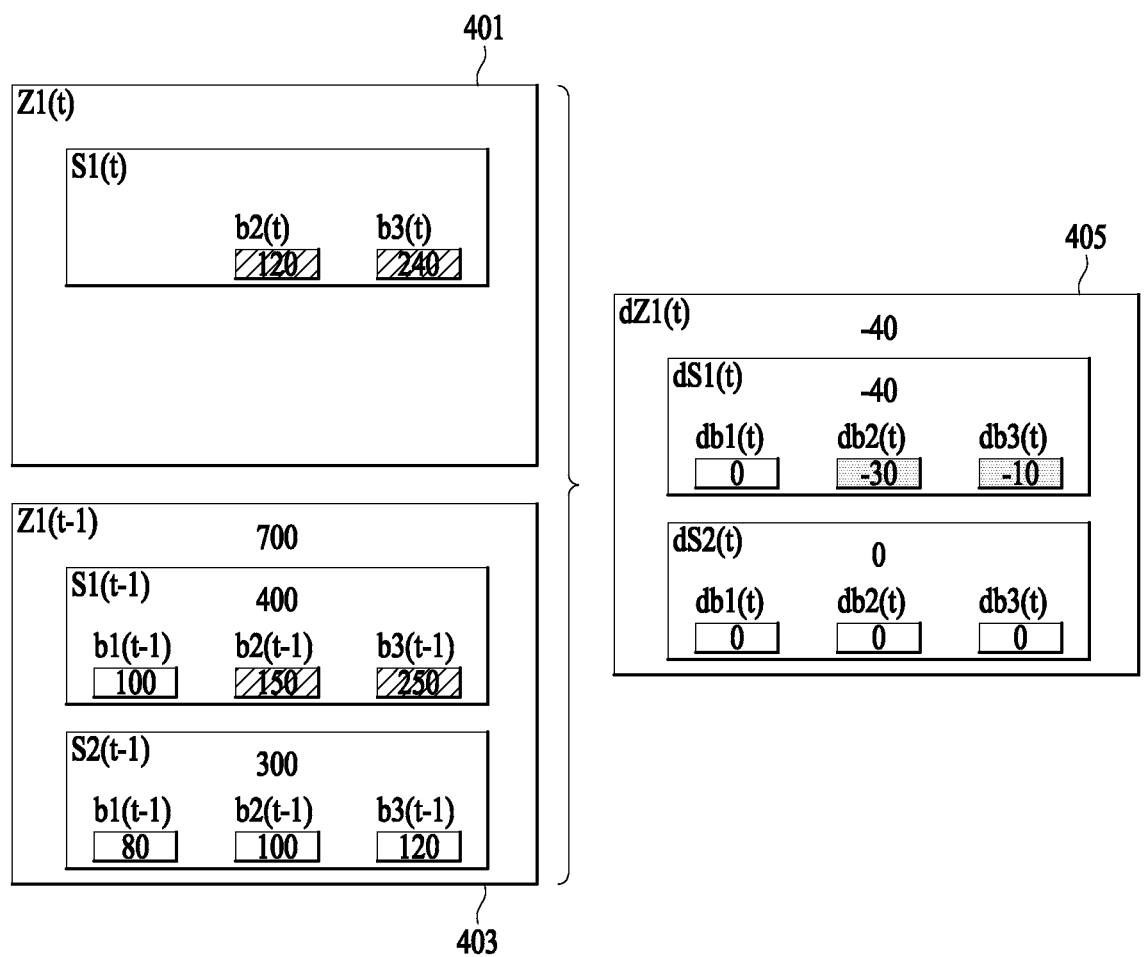
FIGS. 4A through 4F are diagrams illustrating a process of determining space information for each loadable space by calculating a change amount of the corresponding loadable space for inventory management according to an example embodiment of the present disclosure.

Referring to FIG. 4A, an inventory management apparatus 100 may acquire information 401 (e.g., location information and space information) associated with a space of which a state is changed. The location information and space information received through the communication part 110 may include information on the space of a location in which the state is changed. The location information may be expressed in various forms representing a location of each space. For example, location information indicating a space in units of zone may be expressed as $Z1, Z2, \ldots, Zn$. Location information indicating a space in units of shelf included in a zone $Z1$ may be expressed as $Z1S1, Z1S2, \ldots, Z1Sn$. Location information indicating a space in units of bin included in a shelf $S1$ of the zone $Z1$ may be expressed as $Z1S1b1, Z1S1b2, \ldots, Z1S1bn$. Hereinafter, for brevity of description, location information will be expressed as described in the foregoing examples, and is not to be taken as being limited thereto.

Referring to FIG. 4A, location information and space information of a current point in time (e.g., a point in time t) may include "120" that is information on a space positioned at $Z1S1b2$ and "240" that is information on a space positioned at $Z1S2b3$. When the location information and the space information are received, the inventory management apparatus 100 may calculate a state change amount of a space for each a plurality of space units using information 403 on a previous space state (e.g., information on a space in which inventory is to be loaded at a point in time t−1). The information 403 on the previous space state may include information associated with a space for each of the plurality of space units. Thus, the operation part 130 may update information associated with a space of which a state is changed by updating the information on the previous space state based on location information and space information corresponding to the space having the change in state. Referring to FIG. 4A, space information corresponding to locations $Z1S1b2$ and $Z1S2b3$ at the point in time t may be different from space information corresponding to the locations $Z1S1b2$ and $Z1S2b3$ at the point in time t−1. Based on such difference, a state change amount 405 may be determined.

The operation part 130 may determine a state change amount (e.g., $dZ1S1b2(t)$) corresponding to the location $Z1S1b2$ to be "−30" based on "120" that is the space information corresponding to the location $Z1S1b2$ at the point in time t and "150" that is the space information corresponding to the location $Z1S1b2$ at the point in time t−1. Also, the operation part 130 may determine a state change amount (e.g., $dZ1S1b3(t)$) corresponding to the location $Z1S1b3$ to be "−10" based on "240" that is the space information corresponding to the location $Z1S1b3$ at the point in time t and "250" that is the space information corresponding to the location Z1S1b3 at the point in time t−1.

When space information associated with a space of which a state is changed is updated, space information on or regarding an upper space including the space having the change may also be updated. Referring to FIG. 4A, the operation part 130 may determine state change amounts (e.g., dZ1(t) and dS1(t)) of locations of S1 and Z1 which is an upper space including locations b2 and b3 based on dZ1S1b2(t) and dZ1S1b3(t). For example, dZ1S1(t) may correspond to a result obtained through a summation of state change amounts (e.g., dZ1S1b1(t), dZ1S1b2(t), . . . , dZ1S1bn(t)) of one or more bins included in the location S1. Also, dZ1(t) may correspond to a result obtained through a summation of state change amounts (e.g., dZ1S1(t), dZ1S2 (t), . . . , dZ1Sn(t)) of one or more shelves included in the location Z1. Referring to FIG. 4A, due to state changes of spaces corresponding to the locations Z1S1b2 and Z1S1b3, the state change amounts dZ1(t) and dZ1S1(t) of spaces corresponding to the locations Z1 and S1 including Z1S1b2 and Z1S1b3 may be determined to be "−40" and "−40", respectively.

Figure 4B:
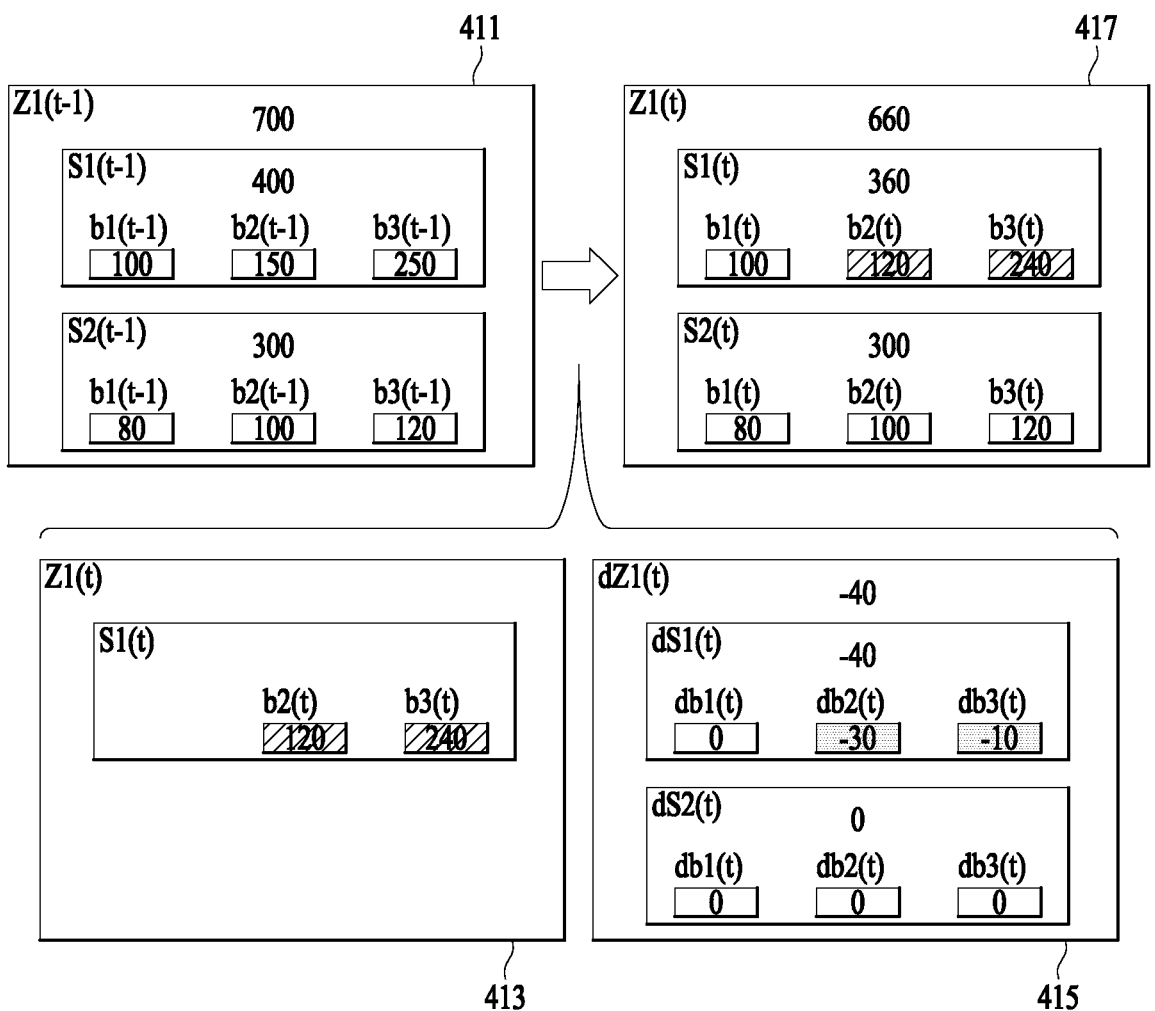

FIG. 4B is a diagram illustrating a process of updating information 417 on a current space state based on information 411 on a previous space state and information 413 including space information and location information.

Referring to FIG. 4B, the inventory management apparatus 100 may update information 417 on a current space state based on the information 411 on the previous space state and a state change amount 415 related to a space of which a state is changed. The inventory management apparatus 100 may calculate the state change amount 415 related to the space having the change in state based on the information 411 on the previous space state and the location information and the space information included in the information 413 received through the communication part 110. The state change amount 415 corresponding to a calculation result may be calculated for the space having the change in state. Among information included in the previous space state, a process of verifying a space state corresponding to each location for performing an update process may be omitted for a space having no state change. Thus, the operation part 130 may perform the update process for the space having the change in state among the information included in the previous space state based on the state change amount 415.

Referring to FIG. 4B, "120" and "240" which are the space information corresponding to the locations Z1S1b2 and Z1S1b3 of the state-changed space may be compared to "150" and "250" which are the space information corresponding the locations Z1S1b2 and Z1S1b3 included in the information 411 on the previous space state. Through such comparison, the operation part 130 may calculate the state change amounts dZ1S1b2(t) and dZ1S1b3(t) corresponding to the locations Z1S1b2 and Z1S1b3 of the state-changed space to be "−30" and "−10." Also, using dZ1S1b2(t) and dZ1S1b3(t), the operation part 130 may calculate the state change amount dZ1S1(t) related to a calculable upper space, that is, S1 and Z1 to be "−40" (=−30−10). Likewise, the operation part 130 may calculate dZ1(t) to be "−40." Based on the calculation results of dZ1S1b2(t), dZ1S1b3(t), dZ1S1 (t), and dZ1(t), the operation part 130 may perform a process of updating a previous space state with a current space state by updating with information associated with the space corresponding to the locations Z1S1b2, Z1S1b3, Z1S1m and Z1 on the information 411 on the previous space state.

Referring to FIG. 4B, the information associated with the space corresponding to the locations Z1, Z1S1, Z1S1b2, and Z1S1b3 may be updated from "700", "400", "150" and "250" of the point in time t−1 to "660" (=700−40), "360" (=400−40), "120" (=150−30), and "240" (=250−10) of the point in time t. A calculation and update process may be omitted for information corresponding to remaining locations (for example, Z2, Z1S2, Z1S1b2, etc.), so that a load of an operation may be reduced.

Figure 4C:
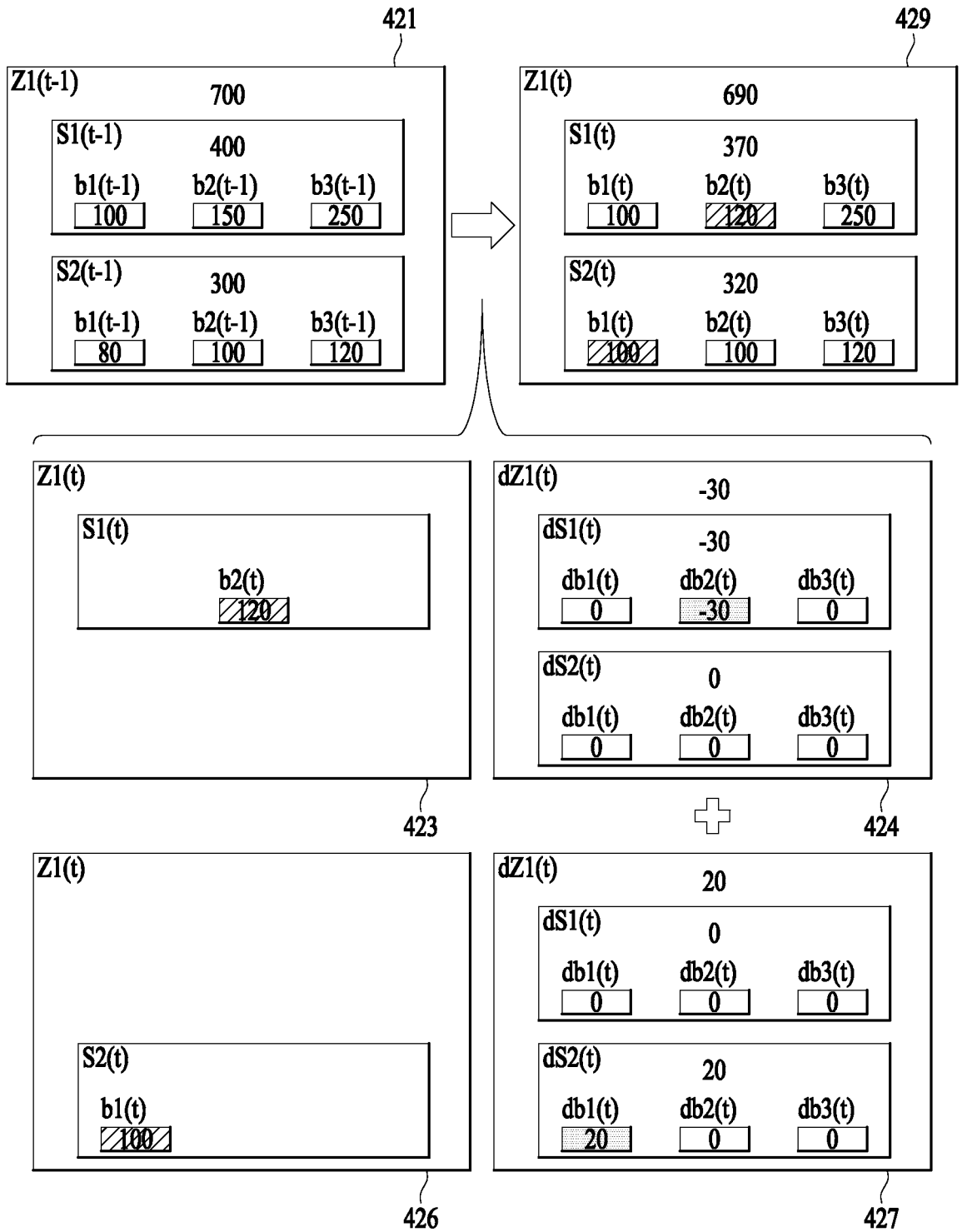

FIG. 4C is a diagram illustrating a process of updating a current space state using information on or regarding a plurality of state change amounts calculated by receiving a plurality of pieces of location information and space information. The inventory management apparatus 100 may update a current space state using a plurality of pieces of state change amount information 424 and 427. Since a task for inventory management is performed by a plurality of operators at a plurality of venues, location information and space information received in response to the space state being changed through an inventory managing task may be received individually.

Referring to FIG. 4C, the communication part 110 may receive a plurality of pieces of location information and space information 423 and 426 associated with a space of which a state is changed. The operation part 130 may calculate the plurality of pieces of state change amount information 424 and 427 corresponding to the plurality of pieces of location information and space information 423 and 426 based on the received plurality of pieces of location information and space information 423 and 426 and information 421 on a previous space state. For example, since the space information corresponding to the location Z1S1b2 at the point in time t is "120" and the space information corresponding to the same position at the point in time t−1 is "150", the state change amount dZ1S1b2(t) corresponding to the location Z1S1b2 may be calculated to be "−30." Also, since the space information corresponding to the location Z1S2b1 at the point in time t is "100" and the space information corresponding to the same location at the point in time t−1 is "80", the state change amount dZ1S2b1(t) corresponding to the location Z1S2b1 may be calculated to be "20."

The operation part 130 may update information 429 on the current space state based on the state change amount dZ1S1b2(t) corresponding to the location Z1S1b2 at the point in time t and the state change amount dZ1S2b1(t) corresponding to the location Z1S2b1 at the point in time t. As an example, when data about the state change amount is provided in plural, the operation part 130 may update the information 429 on the current space state by adding the information 421 on the previous space state and a summation result of information on respective state change amounts. As another example, when data about the state change amount is provided in plural, the operation part 130 may perform an update process using, as the information 429 on the current space state, a result obtained by sequentially reflecting information on respective state change amounts to the information 421 on the previous space state. A process in which the operation part 130 calculates a state change amount based on location information, space information, and information on a previous space state and updates a current space state may be performed through various embodiments as described above.

Figure 4D:
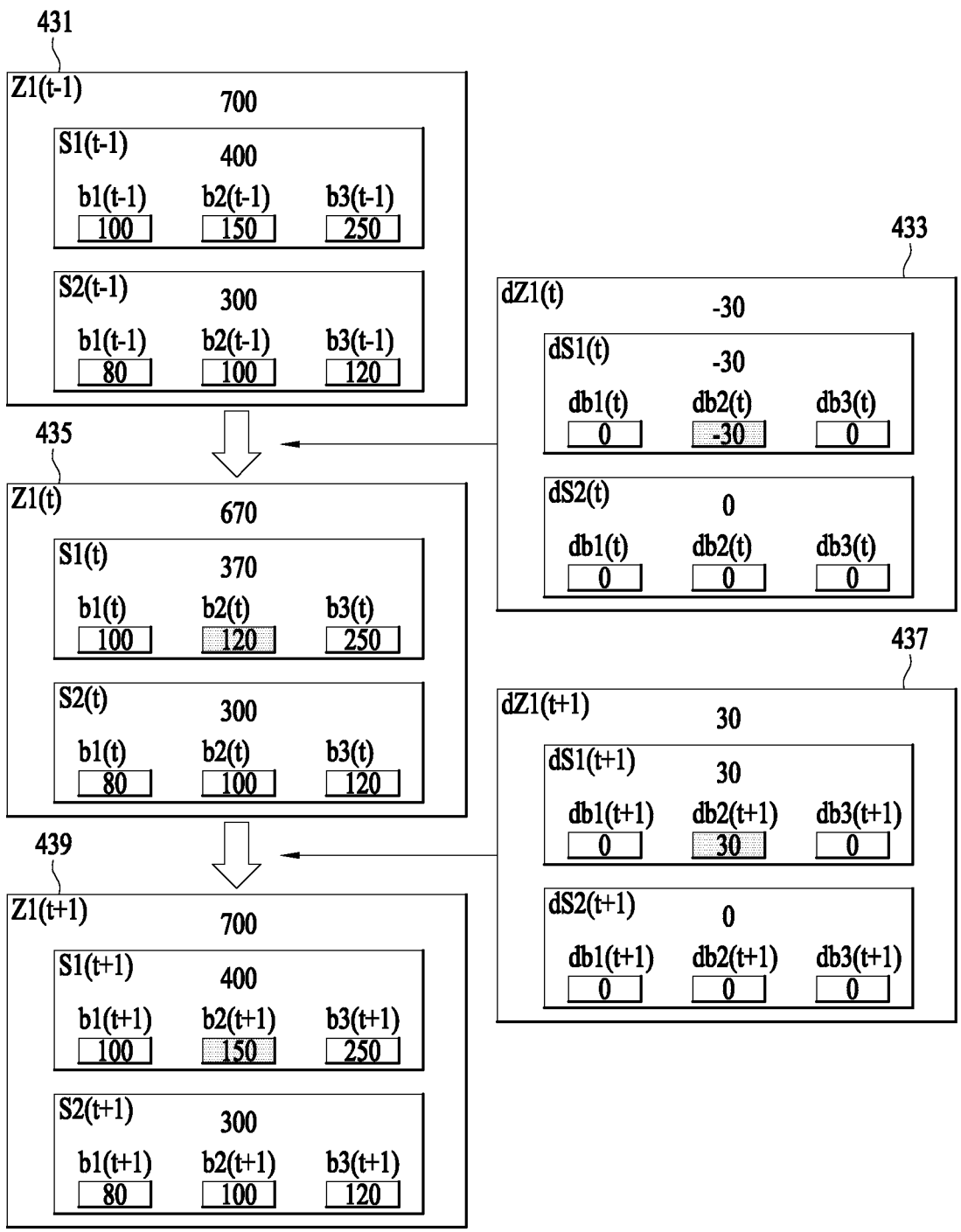

FIG. 4D illustrates a process of updating current state information when a state of the same space is changed.

A plurality of pieces of location information and space information is received while inventory management is conducted for a same space (for example, a space corresponding to the location Z1S1b2) a number of times. Through this, a plurality of pieces of state change amount information 433 and 437 may be calculated. Referring to FIG. 4D, based on information 431 on a previous space state (e.g., a space state at a point in time t−1), space information associated with a space (e.g., a space corresponding to the location Z1S1b2) of which a state is changed at a point in time t may be changed. In this case, the state change amount information 433 on a state change amount including dZ1S1b2(t) may be calculated. By using the calculated state change amount information 433, the state change amount information 435 on a space state of the point in time t may be updated. Also, based on information 435 on a space state of the point in time t, a state of the same space may be changed at a point in time t+1. In this case, the state change amount information 437 on a state change amount including dZ1S1b2(t) may be calculated. By using the calculated state change amount information 437, information 439 on the space state of the point in time t+1 may be updated.

The communication part 110 may receive data including location information and space information at least once for a predetermined period of time. The operation part 130 may calculate at least one state change amount using the location information and the space information received for the predetermined period of time. Referring to FIG. 4D, the predetermined period of time may be a period of time including the point in time t−1 through the point in time t+1. When a plurality of data including the location information and the space information is received for the period of time, the operation part 130 may update the information 439 on a recent space state using final state change amount information corresponding to a result obtained by combining information (e.g., the information 433 and 437) on respective state change amounts calculated based on the received data. As a result of combining the information 433 and 437 on the respective state change amounts, when state change amounts of all spaces are determined as zero, the operation part 130 may omit a process of updating space states. For example, zero may be obtained through an addition of dZ1S1b2(t) and dZ1S1b2(t+1). In this example, since the information 439 on the space state of the point in time t+1 is updated based on a result of the addition, the information 439 may be the same as the information 431 on the space state of the point in time t−1. As such, when the state change amount is determined as zero, an update of the space state may not be required. Thus, even if the location information and the space information is received for a period of time including the point in time t−1 and the point in time t+1, a process of updating the space state of the point in time t+1 may be omitted so that a load of the inventory management apparatus 100 for space state update is reduced.

Figure 4E:
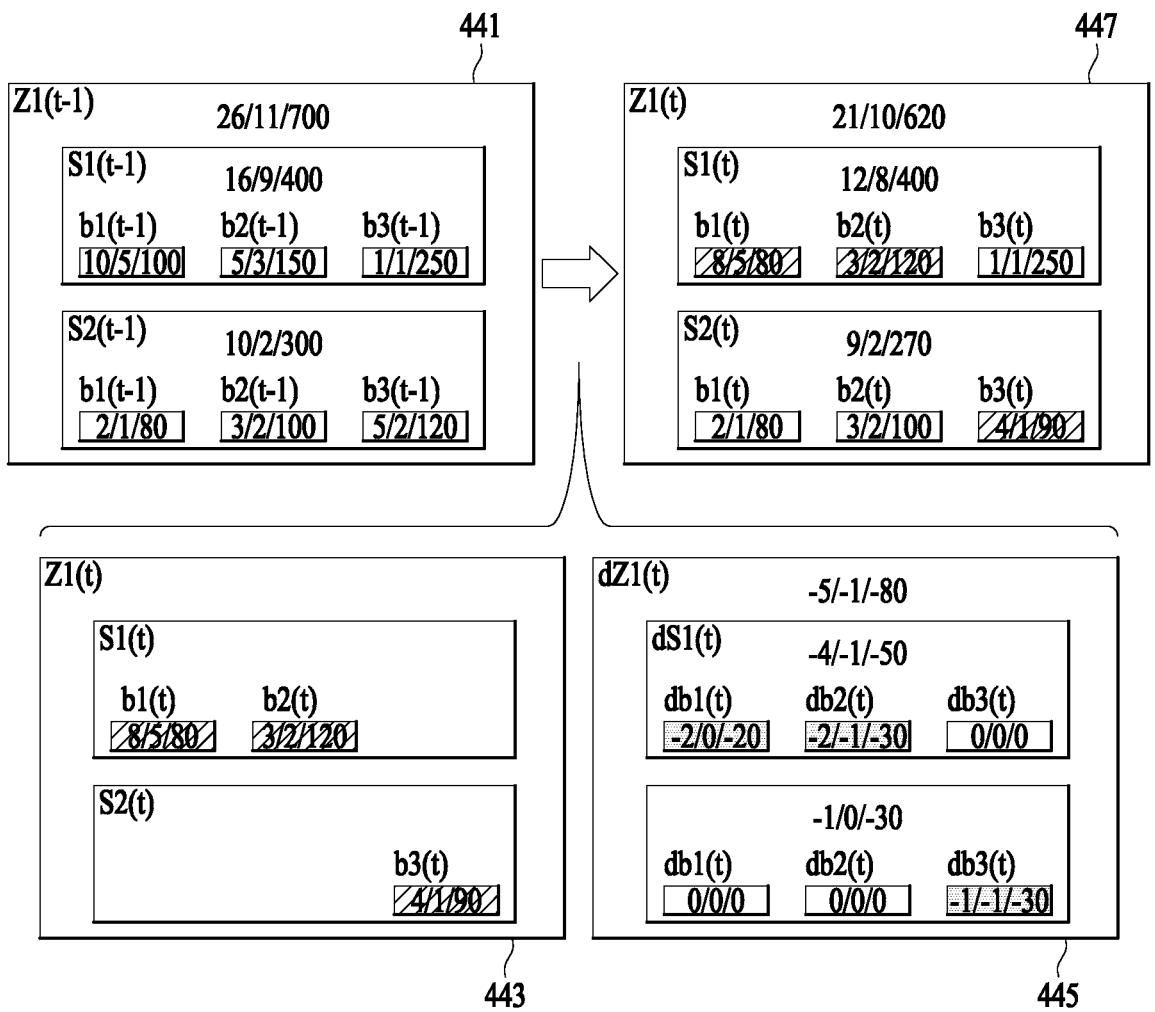

FIG. 4E is a diagram illustrating a method of performing inventory management based on space information including a variety of information.

Space information used by the inventory management apparatus 100 may include at least one of a number of inventories, a number of inventory types, a total inventory volume, or a total loadable volume regarding a space corresponding to the location information. Referring to FIG. 4E, space information corresponding to each location may be expressed based on the number of inventories, the number of inventory types, and/or the total inventory volume, for example. Even though various information included in space information is expressed in an integrated form as described above, it is not necessarily interpreted as being included in one data. For example, the information may be received as individual data distinguished from each other so as to be combined by the operation part 130. The following description will be made under a premise that various information included in space information is expressed in a form of the number of inventories, the number of inventory types, and/or the total inventory volume.

Referring to FIG. 4E, the inventory management apparatus 100 may update information 447 on a current space state using information 441 on a previous space state and a state change amount 445 related to a space of which a state is changed. The inventory management apparatus 100 may calculate the state change amount 445 related to the space having the change in state based on location information and space information included in information 443 received through the communication part 110 and the information 441 on the previous space state. The location information and the space information in the received information 443 may indicate a location and a state of the space having the change in state.

The state change amount 445 corresponding to a calculation result may be calculated for the space having the change in state. A process of verifying a space state corresponding to each location to perform an update may be omitted for a space of which a state is not changed, among pieces of information included in a previous space state. Thus, the operation part 130 may perform an update process using the state change amount 445 for the space having the change in state among the pieces of information included in the previous space state.

Referring to FIG. 4E, 8/5/80, 3/2/120, and 4/1/90 which are space information corresponding to the locations Z1S1b1, Z1S1b2, and Z1S2b3 of the space having the change in state may be compared to 10/5/100, 5/3/150, and 5/2/120 which are space information corresponding to the locations Z1S1b1, Z1S1b2, and Z1S2b3 on the information 441 on the previous space state. Through such comparison, the operation part 130 may calculate dZ1S1b1(t), dZ1S1b2(t), and dZ1S2b3(t) which are state change amounts corresponding to the locations Z1S1b1, Z1S1b2, and Z1S2b3 of the space having the change in state, to be −2/0−20, −2/−1/−30, and −1/−1−30, respectively. Also, by using dZ1S1b1(t), dZ1S1b2(t), and dZ1S2b3(t), the operation part 130 may calculate state change amounts dZ1S1(t), dZ1S2(t), and dZ1(t) related to calculable upper spaces S1 and Z1 to be −4/−1/−50, −1/0/−30, and −5/−1/−80, respectively. The operation part 130 may perform a process of updating the previous space state with the current space state by updating information associated with a space corresponding to the locations Z1S1b1, Z1S1b2, Z1S2b3, Z1S1, Z1S2, and Z1 on the information 441 on the previous space state based on dZ1S1b1(t), dZ1S1b2(t), dZ1S2b3(t), dZ1S1(t)m, and dZ1(t) which are calculation results.

Referring to FIG. 4E, information associated with a space corresponding to the locations Z1, Z1S1, Z1S2, Z1S1b1, Z1S1b2, and Z1S2b3 may be updated from 26/11/700, 16/9/400, 10/5/100, 5/3/150, and 5/2/120 of the point in time t−1 to 21/10/620, 12/8/400, 8/5/80, 3/2/120, and 4/1/90 of the point in time t. A calculation and update process may be omitted for information corresponding to remaining locations (for example, Z2, Z1S2, Z1S1b2, etc.), so that a load of an operation is reduced. An update of information on a space state of the point in time t may be performed using a state change amount and information on a space state of the point in time t−1 associated with each of various types of information included in the space information through various embodiments as described above and thus, redundant description will be omitted.

Figure 4F:
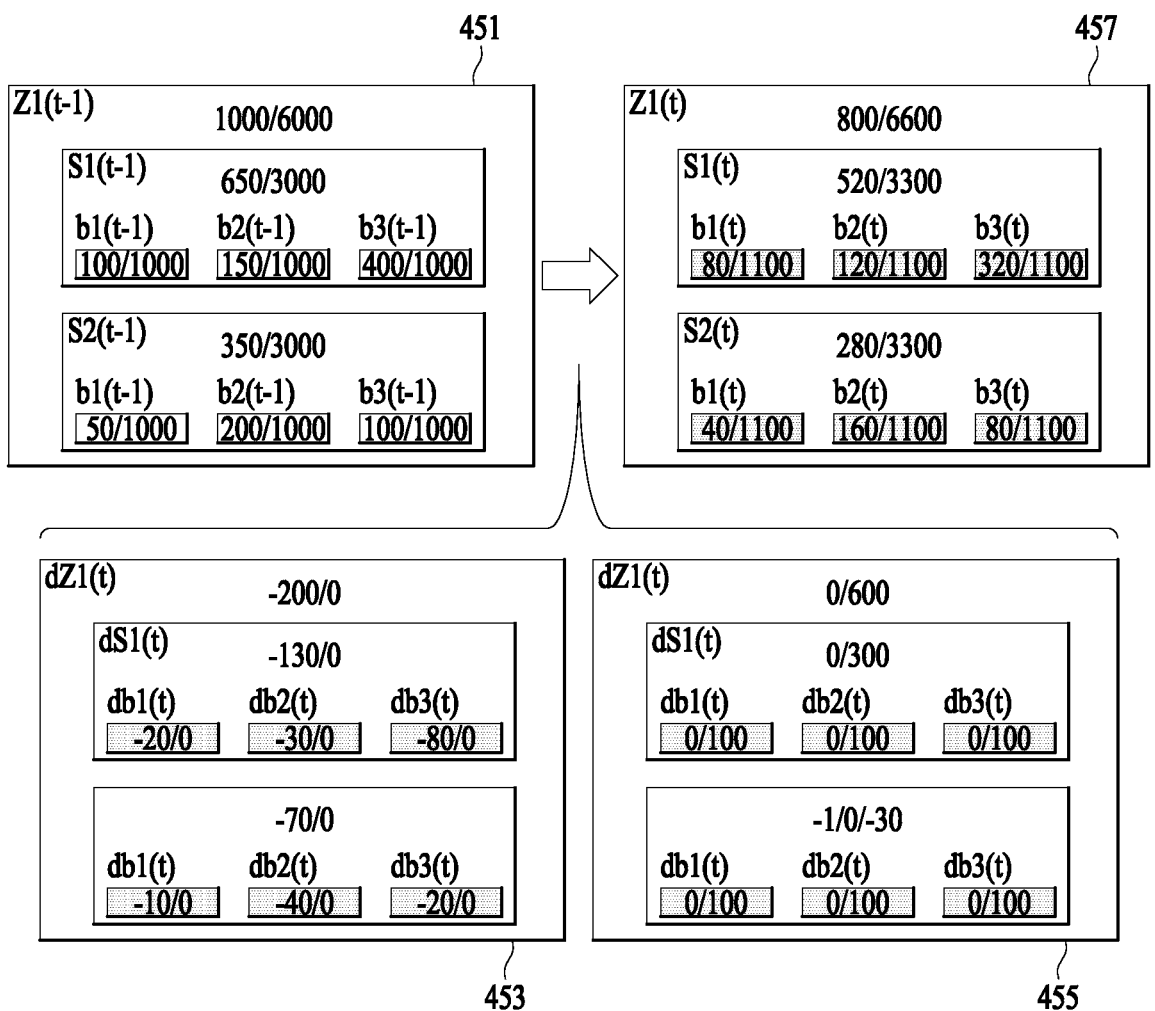

FIG. 4F is a diagram illustrating a process of updating a space state based on a user's action that causes an indirect change of the space state. In addition to a direct change corresponding to a case in which an individual item is managed directly by an operation part like a task such as a movement, removal, and addition of existing stock, a change of the space state may include a case in which the space state is changed due to a collective size modification of a specific item among stowed items, a collective correction of a common state value (e.g., a size, location, and unit of a designed space) of a space for loading the items, an addition of a new loading space, and the like.

The inventory management apparatus 100 may accumulate information on a state change amount satisfying a preset space state change condition for a predetermined period of time. When the predetermined period of time elapses, the inventory management apparatus 100 may update information on a current space state using the accumulated information on the state change amount. When determining the information on the state change amount to be accumulated for the predetermined period of time, the inventory management apparatus 100 may further receive additional information along with the location information and the space information, thereby calculating the information on the state change amount to be accumulated. When the additional information is not received and a data quantity of the location information and the space information exceeds a predetermined threshold data quantity, the inventory management apparatus 100 may determine the information on the state change amount to be accumulated for the predetermined period of time, to be the location information and space information to be used for calculation. The foregoing example is discussed as an example for explaining a part of a method for determining whether to accumulate the location information and the space information and thus, a method of determining the location information and space information used for calculating a state change amount to be accumulated is not limited thereto.

The inventory management apparatus 100 may further include a first storage to accumulate the information on the state change amount or may store the information in an external device or an external server.

Referring to FIG. 4F, the inventory management apparatus 100 may receive a plurality of pieces of location information and space information for a predetermined time after the point in time t−1, which is determined as information to be used for calculating the information on the state change amount to be accumulated for the predetermined period of time.

When collectively modifying a volume of a specific item among items stowed at the point in time t−1, the inventory management apparatus 100 may modify a total inventory volume in a space in which the corresponding item is stowed in proportion to a quantity of each of the items. To collectively modify the total inventory volume, the inventory management apparatus 100 may receive location information and space information associated with the space in which the corresponding item is stowed. Also, the inventory management apparatus 100 may calculate information 453 on a first state change amount using the received location information and space information. The first state change amount may correspond to a change amount of a total inventory volume in each space, which is determined based on the collective modification of an item volume.

When a volume of a loading space is collectively modified at the point in time t−1, volumes of all spaces to be indicated by each location information may also be modified collectively. For such modification of the space volumes, the inventory management apparatus 100 may receive location information and space information associated with the loading space and calculate information 455 on a second state change amount using the received location information and space information. The second state change amount may correspond to a change amount of a space volume for each space.

The inventory management apparatus 100 may accumulate information 453 and 455 on at least one state change amount determined by receiving at least one location information and at least one space information, and use all the accumulated information 453 and 455 for updating the space state when the predetermined period of time elapses.

To accumulate the state change amount for the predetermined period of time, the operation part 130 may combine the information 453 on the first state change amount and the information 455 on the second state change amount after the calculation. For example, −20/100 may be obtained as an integrated state change amount by combining −20/0 and 0/100 which are respective state change amounts for the space of the location Z1S1b1. The operation part 130 may combine state change amounts for respective spaces and update information 457 on a current space state based on the information 451 on the previous space state. A load of the inventory management apparatus 100 may be reduced by collectively modifying inventory management information of a space in which such inventory management is performed, after the predetermined period of time. For example, the predetermined period of time may be set as an early morning time in which direct inventory management is rarely conducted. In this example, the inventory management apparatus 100 may update the current space state in the early morning time based on the state change amount accumulated during operation time.

FIG. 5 is a flowchart illustrating an example implemented based on an inventory management method according to an example embodiment.

An inventory management apparatus 100 may include a communication part or component 510 and an operation part or component 530. In operation S500, an external device 500 may determine that a space state of a predetermined location in which an item is stowed is changed due to an action of a user. In operation S520, the external device 500 may transmit space information and location information corresponding to the change in space state to the communication part 510.

In operation S530, the communication part 510 may receive the space information and the location information corresponding to the change in space state from the external device 500. The location information may indicate at least one space location among a plurality of space units. The space information may correspond to the location information indicating the space of which the state is changed.

In operation S510, a first storage 520 may store information on or regarding a previous space state for each of the plurality of space units. A point in time at which the information on the previous space state is stored may be a predetermined point in time before the space state is changed in operation S500. As an example, the first storage 520 may be implemented as a separate server that is not included in the inventory management apparatus 100. As another example, the first storage 520 may be implemented in a form of a recording medium included in the inventory management apparatus 100.

In operation S540, the communication part 510 having received the location information and the space information may transfer the location information and the space information to the operation part 530. In operation S542, the operation part 530 may acquire the information on or regarding the previous space state in addition to the location information and the space information.

In operation S550, the operation part 530 may calculate a state change amount of a space for each of the plurality of space units based on at least one of the location information, the space information, or the information on or regarding the previous space state for each of the plurality of space units. The operation part 530 may update the information on the previous space state with a current space state for each of the plurality of space units based on the calculated state change amount. Since a process in which the inventory management apparatus 100 calculates the state change amount and updates the information with the current space state for each of the plurality of space units based on the calculated state change amount has been described based on various examples, redundant description will be omitted.

In operation S570, the current space state updated by the operation part 530 may be transmitted to a second storage 540. As an example, the second storage 540 may be implemented as a separate server that is not included in the inventory management apparatus 100. As another example, the second storage 540 may be implemented in a form of a recording medium included in the inventory management apparatus 100. When the second storage 540 is not included in the inventory management apparatus 100, information on the current space state may be transmitted to the second storage 540 through the communication part 510 based on a wired or wireless communication scheme. When the second storage 540 is included in the inventory management apparatus 100, the information on the current space state may be transmitted to the second storage 540 based on various data transmission schemes using a bus, for example.

In operation S580, the second storage 540 may store the received information on the current space state for each of the plurality of space units.

The second storage 540 may include at least one of a RAM, a ROM, a CPU, a GPU, or a bus. The second storage 540 may use various storage schemes to store predetermined data based on a distributed data processing method (e.g., HDFS, Cassandra, etc.) for processing a large quantity of data such as big data.

In operation S590, a user may query information on a predetermined inventory space through the external device 500. To provide the user with the information for which the query is requested, in operation S592, the external device 500 may request a current space state from the second storage 540 in which the current space state is stored. In response to the request, the second storage 540 may transmit the current space state to the external device 500 in operation S594.

Figure 6:
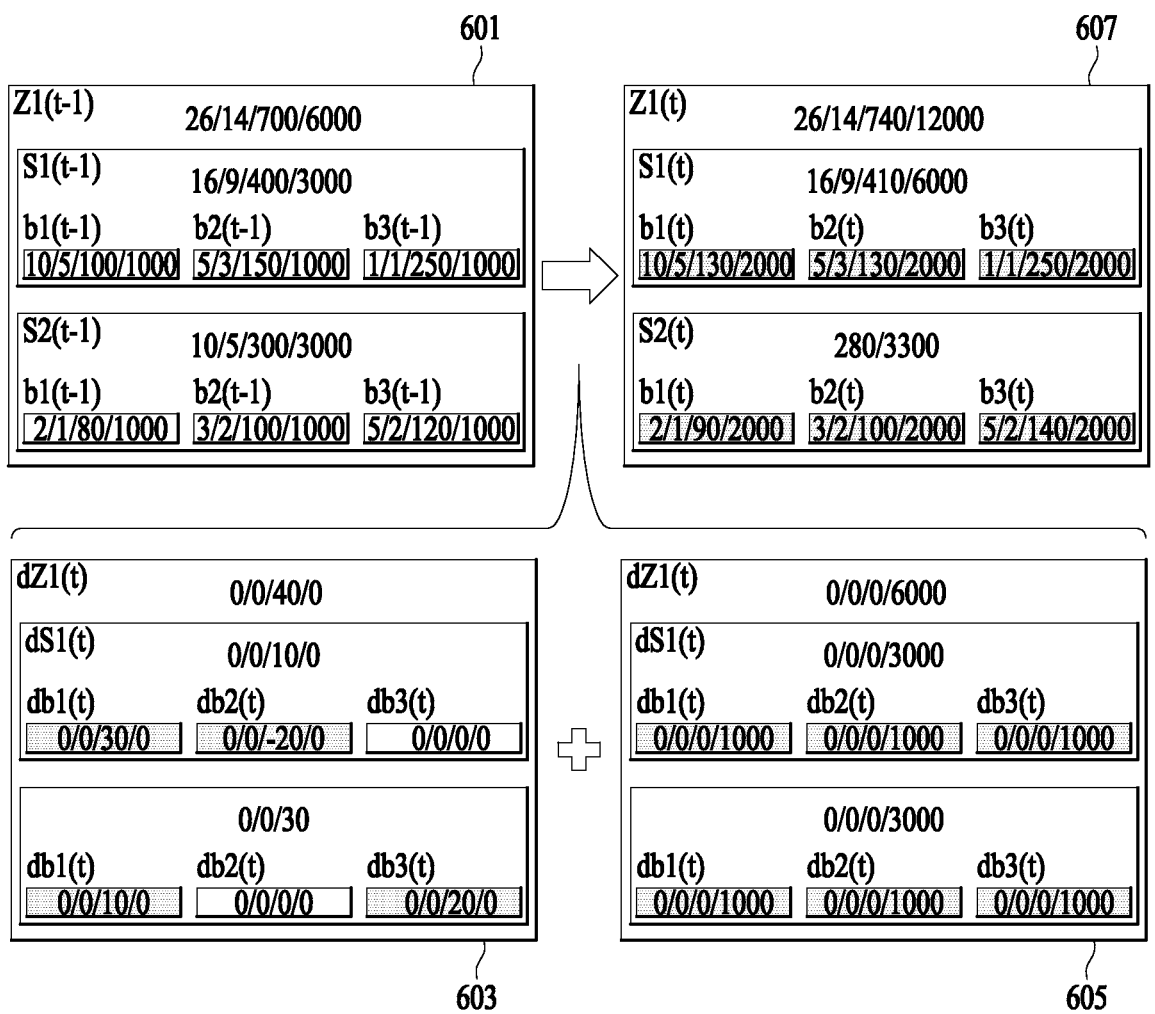
FIG. 6 is a diagram illustrating a process of updating a previous space state with a current space state based on a state change amount calculated based on changes in states of a plurality of types of spaces according to an example embodiment of the present disclosure.

FIG. 6 is a diagram illustrating a process of updating a previous space state with a current space state based on a state change amount calculated based on changes in space states of a plurality of types according to an example embodiment.

Referring to FIG. 6, space information corresponding to each location may be expressed based on, for example, a number of inventories, a number of inventory types, a total inventory volume, and a total volume of a loadable space. Even though various information included as space information is expressed in an integrated form as described above, it is not necessarily interpreted as being included in one data. For example, the information may be received as individual data distinguished from each other so as to be combined by the operation part 130. The following description will be made under a premise that various information included in space information is expressed in a form of a number of inventories, a number of inventory types, a total inventory volume, and a total volume of a loadable space, for example.

The communication part 110 may receive space information and location information associated with a space of which a state is changed. Based on the received information, the operation part 130 may calculate information 603 and 605 on state change amounts. The calculated information 603 and 605 may include the information 603 on a state change amount calculated in response to a user's action (e.g., stock transfer, a change of inventory quantity, a change of information on a predetermined loading space, etc.) that causes a direct change in space state and the information 605 on a state change amount calculated in response to a user's action (a size change of an item, a change of a common state value of a loading space, etc.) that causes an indirect change in space state. Referring to FIG. 6, the information 603 on the state change amount calculated in response to the user's action that causes the direct change in space state may be information indicating a degree to which a total inventory volume is changed due to a space receiving stock moved by a user. The information 605 on the state change amount calculated in response to the user's action that causes the indirect change in space state may be information indicating a degree to which a total loadable volume of a space for each a plurality of units is changed in response to a total volume of loadable spaces being changed collectively.

The operation part 130 may correct or update information 601 on a previous space state to or with information 607 on a current space state based on the information 603 and 605 on the state change amount.

When the information 603 or 605 on the state change amount is calculated, the operation part 130 may determine whether to accumulate the calculated information for a predetermined period of time based on whether the information is calculated based on the user's action that causes the direct change in space state or the user's action that causes the indirect change in space state. In an example, the operation part 130 may accumulate, for the predetermined period of time, the information 605 on the state change amount calculated due to the indirect change of the space state. When the predetermined period of time elapses, the operation part 130 may collectively process the accumulated information and use the information in a process of updating the current space state. In contrast, the operation part 130 may not accumulate the information 603 on the state change amount calculated due to the direct change of the space state and may use the information 603 in the process of updating information 607 on the current space state. In another example, the operation part 130 may accumulate, for a predetermined period of time, all the information 603 and 605 on the state change amount calculated due to the direct and indirect changes of the space states. In this example, the operation part 130 may set a different period of time for accumulation for each type of the information 603 and 605 on the state change amount. Since features of such have been described with reference to the embodiments including the example of FIG. 4D and the like, redundant description will be omitted.

The above-described method according to the present disclosure may be provided as a program to be executed in a computer and may be recorded on a computer readable recording medium. The method according to the present disclosure may be executed via software. When executed via software, the constituent elements of the present disclosure are code segments that execute required operations. The program or the code segments may be stored in an operation part readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. In addition, the computer readable recording medium may be distributed in a computer device connected thereto via a network so that a computer readable code may be stored and executed in a distribution manner.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for managing inventory, the apparatus comprising:
   a communications receiver configured to receive location information indicating at least one space location among a plurality of space units organized in a hierarchical structure and space information corresponding to the location information; and
   a processor configured to calculate a state change amount related to the at least one space location based on at least one of the location information, the space information, or information on a previous space state for each of the plurality of space units and generate a current space state based on the previous space state for each of the plurality of space units and the state change amount.

2. The apparatus of claim 1, wherein the space information includes at least one of a number of inventories, a number of inventory types, a total inventory volume, or a total loadable volume regarding a space corresponding to the location information.

3. The apparatus of claim 2, wherein the processor is further configured to update the information on the previous space state with the information on the current space state by calculating the state change amount and updating at least one of a number of inventories, a number of inventory types, a total inventory volume, or a total loadable volume for each of the plurality of space units.

4. The apparatus of claim 1, wherein the communications receiver is further configured to receive the location information indicating a space location for each of at least two units among the plurality of space units.

5. The apparatus of claim 1, wherein the processor is further configured to transmit the updated information regarding the current space state for each of the plurality of space units to a second storage.

6. The apparatus of claim 1, wherein the communications receiver is configured to receive the location information and the space information when a state of a space is changed.

7. The apparatus of claim 1, wherein the processor is further configured to perform based on the state change amount accumulated for a predetermined period of time.

8. The apparatus of claim 7, wherein the processor is further configured to update the information on the previous space state with the information on the current space state by accumulating, for the predetermined period of time, the state change amount calculated in response to information on an item or information on a loading space being changed collectively.

9. A method operable by an electronic apparatus to manage inventory, the method comprising:
   receiving, at a communications receiver of the electronic apparatus, location information indicating at least one space location among a plurality of space units organized in a hierarchical structure and space information corresponding to the location information;
   calculating, at a processor of the electronic apparatus, a state change amount related to the at least one space location based on at least one of the location information, the space information, or information on a previous space state for each of the plurality of space units; and
   generating, at the electronic apparatus, a current space state based on the previous space state for each of the plurality of space units and the state change amount.

10. The method of claim 9, wherein the space information includes at least one of a number of inventories, a number of inventory types, a total inventory volume, or a total loadable volume regarding a space corresponding to the location information.

11. The method of claim 9, wherein the updating comprises:
    updating the information on the previous space state with the information on the current space state by calculating the state change amount and updating at least one of a number of inventories, a number of inventory types, a total inventory volume, or a total loadable volume for each of the plurality of space units.

12. The method of claim 9, wherein the receiving comprises receiving the location information indicating a space location for each of at least two units among the plurality of space units.

13. The method of claim 9, further comprising:
    transmitting the updated information on the current space state for each of the plurality of space units to a second storage.

14. The method of claim 9, wherein the receiving comprises receiving the location information and the space information when a state of a space is changed.

15. The method of claim 9, wherein the updating the information on the previous space state comprises:
    updating the information on the previous space state with the information on the current space state based on the state change amount accumulated for a predetermined period of time.

16. The method of claim 15, wherein the updating of the information on the previous space state further comprises:
    updating the information on the previous space state with the information on the current space state by accumulating, for the predetermined period of time, the state change amount calculated in response to information on an item or information on a loading space being changed collectively.

17. A non-transitory computer readable recording medium comprising a computer program for performing the method of claim 9.

* * * * *